United States Patent [19]
Goto et al.

[11] 3,845,621

[45] Nov. 5, 1974

[54] MANIFOLD REACTOR

[75] Inventors: Kenji Goto; Michiya Nakamura, both of Shizuoka-ken, Japan

[73] Assignee: Toyota Jidosha Kogyo Kabushiki Kaisha, Toyota-shi, Aichi-ken, Japan

[22] Filed: July 23, 1973

[21] Appl. No.: 381,422

[30] Foreign Application Priority Data
Aug. 22, 1972  Japan.............................. 47-83322

[52] U.S. Cl........................ 60/282, 60/322, 60/323
[51] Int. Cl............................................ F01n 3/10
[58] Field of Search...................... 60/282, 322, 323

[56] References Cited
UNITED STATES PATENTS

| | | | |
|---|---|---|---|
| 3,581,494 | 6/1971 | Scheitlin | 60/323 |
| 3,703,083 | 11/1972 | Tadokoro | 60/282 |

*Primary Examiner*—Douglas Hart
*Attorney, Agent, or Firm*—Toren, McGeady and Stanger

[57] ABSTRACT

In a manifold reactor secondary air and exhaust gases, containing combustible noxious substances, are burned in a core formed within an inner tubular wall. The inner wall is enclosed by one half shell segment and a combination of an outer wall, a connecting pipe, and an annular plate secured to the connecting pipe and in slidable contact with the outer wall. Another half shell segment encloses the outer wall. Insulating material is filled into the space between the inner wall and its enclosing structure. An inlet pipe extends into the interior of the inner tubular wall in inwardly spaced relationship from the connecting pipe and the inner wall. Further, an outlet pipe extends from the interior of the inner wall through the one half shell segment enclosing the inner wall. When the inner wall is exposed to high temperatures and expands, the expansion is taken up by the slidable contact between the annular plate and the outer wall.

7 Claims, 4 Drawing Figures

PATENTED NOV 5 1974　　3,845,621

MANIFOLD REACTOR

BACKGROUND OF THE INVENTION

1. Field of Invention

This invention is directed to a heat-proof construction for a manifold reactor in which the noxious substances exhausted from an engine in a motor vehicle, such as carbon monoxide and hydrocarbons, can be burned in combination with secondary air before being discharged into the atmosphere.

2. Description of the Prior Art

Generally, a manifold reactor is installed at a location coinciding with the exhaust manifold and consists of a tubular core and a shell. The unburned carbon monoxide, hydrocarbons and similar substances contained in the exhaust gases, are mixed and burned with secondary air in the core so that such substances are removed from the exhaust gases. To improve the purification rate of carbon monoxide and hydrocarbons by promoting their combustion in a manifold reactor, the heat retention effect of the device needs to be enhanced. Accordingly, it has been proposed to form the shell of the reactor by a double wall construction, including an inner wall and an outer wall, with a heat insulating material filled into the double wall to obtain adiabatic heat retention. However, if the shell is constructed of such a double wall structure, an excessively great temperature difference is developed between the inner and outer walls, since the inner wall is exposed to extremely high temperatures during combustion. If the two walls are joined together in an integral manner, thermal expansion of the inner wall is suppressed and great internal stress is developed in the inner wall. As a consequence, the concentration of such stresses in the inner wall may produce cracks. Further, when the weld zone between the walls has been weakened by high heat fusion and is directly exposed to the heat of combustion, such weld zone tends to corrode and to rupture due to the high temperature combustion heat.

SUMMARY OF THE INVENTION

Therefore, the primary object of the present invention is to provide an improved manifold reactor construction which allows effective release of any thermal expansion of the inner wall and also maintains the inner wall free from high temperature thermal corrosion.

The various features of novelty which characterize the invention are pointed out with particularity in the claims annexed to and forming a part of this disclosure. For a better understanding of the invention, its operating advantages and specific objects attained by its use, reference should be had to the accompanying drawing in which there is illustrated and described a preferred embodiment of the invention.

DETAILED DESCRIPTION OF THE INVENTION

Figure 1:
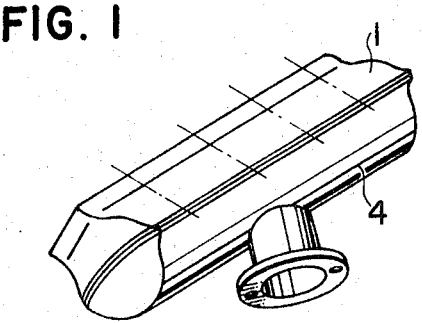
FIG. 1 is a perspective view of a manifold reactor embodying the present invention.
Figure 2:
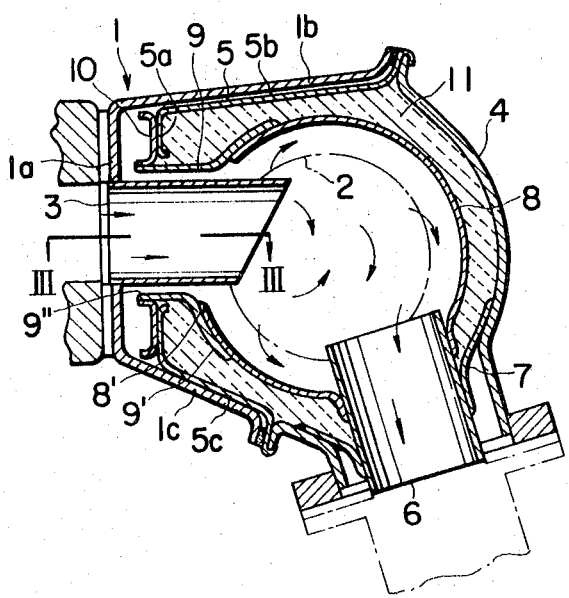
FIG. 2 is a sectional view taken along the line II—II in FIG. 1.
Figure 3:
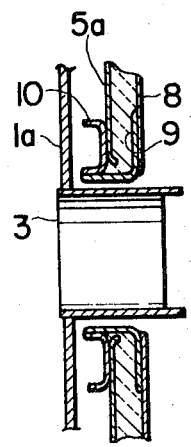
FIG. 3 is a partial sectional view of the manifold reactor taken along the line III—III in FIG. 2.

In FIG. 1 the exterior shell of the manifold reactor is formed of a channel-shaped first half shell segment 1 and an arcuately-shaped second half shell segment 4. As shown in FIG. 2, the first half shell segment 1 consists of a front portion 1a secured to the engine and upper and lower portions 1b, 1c extending outwardly from the opposite edges of the front portion 1a away from the engine. Inlet pipes 3 are secured centrally of the front portion 1a and extend into the interior or core 2 within the manifold reactor. Each of the inlet pipes 3 is connected to an exhaust port of the engine for conducting exhaust gases into the core 2.

Second half shell segment 4 is joined to the free end edges of the upper and lower portions 1b and 1c of the first half shell segment 1. Located within the first half shell segment 1 is an outer wall 5 which is secured at its ends into the joint between the half shell segments 1 and 4. As viewed in FIG. 2, the outer wall 5 consists of upper and lower portions 5b, 5c which extend along the upper and lower portions 1b, 1c, respectively, of the first half shell segment 1. In addition, the front portion 5a of the outer wall extends in generally parallel relationship with the front portion 1a of the first half shell segment and is spaced inwardly from the front portion.

Located centrally along the length of the manifold reactor and extending obliquely downwardly from the second half shell segment 4 is an outlet pipe 6 which extends through an opening in the second half shell segment and is joined to it by a connecting pipe 7. As indicated in dot-dash lines in FIG. 2, the outer end of the outlet pipe 6 is connected to an exhaust pipe 7.

Spaced inwardly from the outer wall 5 and the second half shell segment 4 is a tubular inner wall 8 which extends about and encloses the core 2. At one point along its lower surface, the inner wall 8 is connected to the outlet pipe 6 inwardly from the pipe's connection to the connecting pipe 7. The inner wall 8 has an opening at the location of each inlet pipe 3 so that the inlet pipe extends into the core 2 with its inner end spaced inwardly from the opening 8' in the inner wall. The inner wall is intended, in combination with the outer wall 5, to form a double-wall structure enclosing the core 2. At each of the openings 8' in the inner wall an end 9' of a connecting pipe 9 extends over the outer surface of the inner wall 8 and the connecting pipe is spaced outwardly from the corresponding inlet pipe 3. Further, the outer surface of the connecting pipe 9 is spaced radially inwardly from the inner end of the opening in the front portion 5a of the outer wall 5. The other end 9'' of the connecting pipe located closer to the front portion 1a of the first half shell segment 1, is secured to an annular plate 10 and the annular plate extends radially outwardly from the outer surface of the connecting pipe and is disposed for a considerable portion of its radial extent in slidable contact with the surface of the front portion 5a of the outer wall 5 which is directed toward the front portion 1a of the first half shell segment 1.

A heat insulating material 11 is filled into the space defined by the second half shell segment 4, the outer wall 5, the inner wall 8, the connecting pipe 9 and annular plate 10. As indicated in FIG. 2, the end 9' of the connecting pipe 9 extends over the outer surface of the inner wall 8 from its opening 8' and the connecting pipe is fusion welded to the outer surface of the inner wall 8 at a position spaced from its opening 8'.

Figure 4:
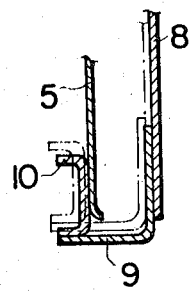
FIG. 4 is a sectional view of a portion of the reactor shown in FIG. 3, illustrating the thermal expansion of the inner wall of the manifold reactor.

In the use of the manifold reactor, exhaust gases and secondary air are introduced into the core 2 through the inlet pipes 3 and are burned in the core which is heat-insulated by the heat-insulating material 11, and the combustion gases emerge from the core, as shown by the arrows in FIG. 2 and are guided by the inner wall into the outlet pipe 6 without contacting the weld between the inner wall and the connecting pipe 9. With the inner wall directly exposed to high temperature combustion heat, it expands outwardly and the annular plate 10 which is in sliding contact with the front portion 5a of the outer wall 5 moves along the front portion 5a permitting free expansion of the inner wall together with the connecting pipe 9 and the annular plate 10, as shown in FIG. 4. Further, if the heat-insulating material 11 is thermally expanded and develops an expansion pressure, since the front portion 5a of the outer wall is not directly secured to the annular plate 10, it affords an easy release of such expansion pressure.

Therefore, in accordance with the present invention, though the inner wall is directly exposed to combustion heat, since it is in slidable contact with the outer wall 5 through the medium of the connecting pipe 9 and annular plate 10 and with the heat-insulating material 11 between the inner wall 8 and the outer wall 5, any thermal expansion of the inner wall 8 and the insulating material 11 is easily accommodated and the structure of the manifold reactor is maintained free of cracks and its durability is markedly improved. Further, with the annular plate positioned in contact with the front portion 5a of the outer wall 5, combustion gases are prevented from leaking into the insulating material 11 when the inner wall 8 expands. Further, the weld zone of the connecting pipe 9 and the inner wall 8 is not exposed directly to combustion gases and, as a result, the weld zone remains safe from corrosion and possible failure due to exposure to high temperature combustion heat.

While specific embodiments of the invention have been shown and described in detail to illustrate the application of the inventive principles, it will be understood that the invention may be embodied otherwise without departing from such principles.

What is claimed is:

1. A manifold reactor comprising an inlet pipe arranged to be connected to an engine exhaust port, an outlet pipe arranged to be connected to an exhaust pipe, a first half shell segment secured to and laterally enclosing said inlet pipe, a second half shell segment joined to said first half shell segment and said shell segments forming an outer closure for the manifold reactor, an outer wall secured within the joint between said first and second half shell segments and extending therefrom inwardly within said first half shell segment, a tubular inner wall located within said first and second half shell segments so that a core of gases received from an engine through said inlet pipe is formed within said inner wall, said inner wall spaced inwardly from said outer wall and said second half shell segment, a heat-insulating material filled into the space between said inner wall and said outer wall and said second half shell segment, said inner wall having an opening extending about and spaced outwardly from said inlet pipe, a connecting pipe section secured to said inner wall about the opening therein with said connecting pipe extending around and spaced outwardly from said inlet pipe, said connecting pipe section spaced inwardly from said outer wall, an annular plate secured to the end of said connecting pipe section spaced from its connection to said inner wall and extending outwardly therefrom into sliding contact with the opposite end of said outer wall from the end connected to the joint between said half shell segments.

2. A manifold reactor, as set forth in claim 1, wherein said connecting pipe overlaps the outwardly facing surface of said inner wall at the opening in said inner wall through which said inlet pipe extends and the end of said connecting pipe is welded to the outer surface of said inner wall at its end spaced from the opening in said inner wall so that the weld therebetween is not directly exposed to combustion gases generated in the core within said inner wall.

3. A manifold reactor, as set forth in claim 2, wherein said inlet pipe projects into the interior of said inner wall for directing gases into the core formed said inner wall.

4. A manifold reactor, as set forth in claim 1, wherein said first half shell section has a front portion arranged to be secured to the engine and an upper portion and a lower portion each extending angularly from an opposite edge of said front portion and disposed in diverging relationship as they extend outwardly from the location of the engine.

5. A manifold reactor, as set forth in claim 4, wherein said second half shell segment has an arcuate configuration and extends between the outwardly directed ends of said upper and lower portions of said first half shell segment, said second half shell segment having an opening through which said outlet pipe extends in spaced relationship from said second half shell segment, and an outlet connecting pipe laterally enclosing a portion of the length of said outlet pipe and secured to said second half shell segment and to said outlet pipe at spaced locations along the axis of said outlet pipe.

6. A manifold reactor, as set forth in claim 5, wherein said outlet pipe is connected to said inner wall at a location spaced inwardly from the connection of said outlet connecting pipe to said outlet pipe and said outlet pipe projects into the interior of said inner wall.

7. A manifold reactor, as set forth in claim 4, wherein the inner periphery of said annular plate is spaced radially outwardly from said inlet pipe and said annular plate extends radially outwardly from said inlet pipe and is in sliding contact with said outer wall for a substantial portion of its radially extending dimension.

* * * * *